(12) United States Patent
Griffin

(10) Patent No.: US 8,382,425 B2
(45) Date of Patent: Feb. 26, 2013

(54) HYDRAULIC ENERGY CONVERTER

(76) Inventor: Ronald A. Griffin, Cody, WY (US)

( * ) Notice: Subject to any disclaimer, the term of this patent is extended or adjusted under 35 U.S.C. 154(b) by 0 days.

(21) Appl. No.: 13/083,348

(22) Filed: Apr. 8, 2011

(65) Prior Publication Data

US 2011/0179787 A1    Jul. 28, 2011

(51) Int. Cl.
*F03B 11/02* (2006.01)
(52) U.S. Cl. .............. 415/126; 415/124.1; 415/906; 416/63; 416/170 R; 416/244 R
(58) Field of Classification Search .............. 415/124.1, 415/126, 906; 416/63, 146 R, 170 R, 146, 416/DIG. 4, DIG. 6, 244 R; 290/43, 54
See application file for complete search history.

(56) References Cited

U.S. PATENT DOCUMENTS

| | | | |
|---|---|---|---|
| 100,761 A * | 3/1870 | Heitmann | 415/7 |
| 385,261 A * | 6/1888 | Garrison | 416/85 |
| 950,676 A * | 3/1910 | Price | 415/7 |
| 3,687,567 A * | 8/1972 | Lininger | 415/7 |
| 5,937,644 A | 8/1999 | Dipnall | |
| 6,051,892 A | 4/2000 | Toal, Sr. | |
| 6,073,445 A | 6/2000 | Johnson | |
| 6,246,125 B1 | 6/2001 | Axtell | |
| 6,409,466 B1 | 6/2002 | Lamont | |
| 6,420,794 B1 | 7/2002 | Cao | |
| 6,508,191 B1 | 1/2003 | Sporljaric | |
| 6,551,053 B1 | 4/2003 | Schuetz | |
| 6,647,717 B2 | 11/2003 | Zaslavsky et al. | |
| 6,648,589 B2 | 11/2003 | Williams | |
| 6,710,469 B2 | 3/2004 | McDavid, Jr. | |
| 6,755,607 B1 | 6/2004 | Hester et al. | |
| 6,765,308 B1 | 7/2004 | Kazanjian et al. | |
| 6,798,080 B1 | 9/2004 | Baarman et al. | |
| 6,800,955 B2 | 10/2004 | McDavid, Jr. | |
| 6,861,766 B2 | 3/2005 | Rembert | |
| 6,885,114 B2 | 4/2005 | Baarman et al. | |
| 6,957,947 B2 | 10/2005 | Williams | |
| 7,061,135 B2 | 6/2006 | Rammler et al. | |
| 7,084,521 B1 | 8/2006 | Martin | |
| 7,147,428 B2 | 12/2006 | Lamont | |
| 7,233,078 B2 | 6/2007 | Baarman et al. | |
| 7,329,963 B2 | 2/2008 | Omer | |
| 7,492,054 B2 | 2/2009 | Catlin | |
| 7,503,744 B1 | 3/2009 | Broome | |
| 7,564,144 B1 | 7/2009 | Srybnik et al. | |
| 7,602,076 B1 | 10/2009 | Sipp | |
| 7,605,490 B2 | 10/2009 | Srybnik et al. | |
| 7,619,320 B2 | 11/2009 | Omer | |

(Continued)

*Primary Examiner* — Ninh H Nguyen
(74) *Attorney, Agent, or Firm* — Santangelo Law Offices

(57) ABSTRACT

The inventive technology, in certain embodiments, may be described as a hydraulic energy converter 1 that comprises: a frame assembly 2 that itself comprises a first frame portion 3 and a second frame portion 4 that is positionally adjustable relative to said first frame portion, said first frame portion affixable in stationary position relative to a water channel structure 5; an axle 6 connected with said second frame portion 4; a driveshaft 7 established substantially orthogonally to said axle 6; waterwheels 8 connected with said axle 6; a gearbox 9 connecting said driveshaft 7 with said axle 6 and established between said waterwheels 8; and at least one rotational energy converting device 10 connected with said driveshaft 7 and said second frame portion 4. A related aspect of the inventive technology—a wind energy converter—may include rotors instead of waterwheels (in addition to perhaps reflecting other differences). Particular aspects of the inventive technology may focus on relative adjustability of certain components thereof, a novel and non-obvious relative positioning of known components and, generally, a novel and non-obvious combination of known components.

18 Claims, 7 Drawing Sheets

U.S. PATENT DOCUMENTS

| | | | |
|---|---|---|---|
| 7,621,129 B2 | 11/2009 | DuBois | |
| 7,670,101 B2 | 3/2010 | Mui | |
| 7,701,076 B2 | 4/2010 | Baarman et al. | |
| 7,768,147 B2 | 8/2010 | Baarman et al. | |
| 7,777,359 B1 | 8/2010 | Gibson | |
| 7,812,470 B2 | 10/2010 | Baarman et al. | |
| 7,854,119 B2 | 12/2010 | Strain | |
| 2010/0308591 A1 | 12/2010 | Godfrey | |
| 2010/0327597 A1 | 12/2010 | Patel | |
| 2011/0006533 A1 | 1/2011 | Seymour | |
| 2011/0018272 A1 | 1/2011 | Lehoczky | |

\* cited by examiner

HYDRAULIC ENERGY CONVERTER

BACKGROUND OF INVENTION

Efficient, low environmental impact power generation is a critical need today. Whether because of high costs associated with fossil fuels, including their unavoidable environmental impact, or for other reasons, there has been a steady push in the past 30 years or so toward more environmentally friendly, i.e., greener, and, hopefully less costly, power generation. Indeed, this was a significant motivation behind the conception of the inventive technology disclosed herein. In providing an entirely sustainable, renewable energy source based, low visual impact, and localized power generation system, that outputs few or no environmental contaminants whatsoever, the inventive technology disclosed herein, in embodiments, meets most or all of many of the goals of an ideal power generation system—low or no environmentally harmful emissions, low visual impact, localized and easily movable, constructable, in large part, with many used components, sustainable, and consumptive of only renewable energy.

Agricultural businesses require electrical power for a variety of reasons—irrigation pumps, spraying systems, heating, etc. Often, farms have water channels—whether canals or other—through which water flows. Of course, flowing water, whether first impounded or not, can be harnessed to provide a desired power (whether electrical or otherwise). Indeed, windmills and hydroelectric plants have capitalized on this for quite some time. But there have been limited efforts—beyond traditional watermills—to harness energy from the water channels (including their drop structures through which typically moderately impounded water falls) for localized needs (e.g., the aforementioned power needs that are so common on a farm). Indeed, the inventive technology, in embodiments, involves the provision of power locally (i.e., such that resistive voltage drop does not become an issue), typically on the same farm or agricultural facility as the channeled water course providing the primary energy source. While the most readily amenable application for the inventive system may be a farm, the inventive technology may certainly find application elsewhere.

It is also of note that, in addition to the benefits of the use of a renewable source of energy to provide low or zero emission power via a low visual impact system, a related benefit may relate to the fact that the power generation system (or, more generally, hydraulic energy converter) may be local to (proximal) the renewable energy source (the flowing, perhaps falling water) and the rotational energy converting device (whether it be an electric power generator, a pump (whether water or otherwise), or a compressor, as but a few examples). Indeed, one motivator for the conception of the inventive technology acknowledged power needs on a farm and inquired as to what sort of renewable energy sources are commonly found on farms.

BRIEF SUMMARY OF INVENTION

The inventive technology, in certain embodiments, may be described as a hydraulic energy converter 1 that comprises: a frame assembly 2 that itself comprises a first frame portion 3 and a second frame portion 4 that is positionally adjustable relative to the first frame portion, the first frame portion affixable in stationary position relative to a water channel structure 5; an axle 6 supported the second frame portion 4; at least one driveshaft 7 established substantially orthogonally to the axle 6; waterwheels 8 connected with the axle 6; a gearbox 9 connecting at least one of the potentially several driveshafts 7 with the axle 6 and established between the waterwheels 8; and at least one rotational energy converting device 10 connected with at least one of the driveshaft 7 and the second frame portion 4. Particular aspects of the inventive technology may focus on relative adjustability of certain components thereof, a novel and non-obvious relative positioning of known components and, generally, a novel and non-obvious combination of known components. Certain embodiments of the inventive technology may relate to a wind energy converter that uses at least some of the components used for the hydraulic energy converter.

Particular embodiments of the inventive technology may be described as a wind energy converter 101 that comprises: an axle 102 having two ends 103, 104; two rotors 105, each of which is established at a different one of the two ends of the axle; a driveshaft 106 established substantially orthogonally to the axle; a ninety degree gearbox 107 connecting the driveshaft with the axle and established between the two rotors; an operational controller 108 established to control operation of the wind converter apparatus; at least one rotational energy converting device 110 connected with the driveshaft; and a frame 111 that supports the axle and the at least one rotational energy converting device.

It is a goal of certain embodiments of the inventive technology to provide a low lifetime cost apparatus for converting a renewable energy source—flowing water and/or wind—to a more desired, more practically useful energy source.

It is a goal of certain embodiments of the inventive technology to use locally available energy sources to provide power (and other converted energy forms) locally.

It is a goal of certain embodiments of the inventive technology to enhance the quality of the environment by providing a low or no emissions alternative to off the grid electricity. Of course, grid electricity may be generated through combustion of coal in a relatively high emissions process. As such, a related goal of the inventive technology is to reduce greenhouse gas emissions. It is of note that even other manners of generating grid electricity, such as nuclear power generation, are not without their environmental impact, and that embodiments of the inventive technology obviate such impacts.

It is a goal of certain embodiments of the inventive technology to provide a hydraulic energy converter that may be readily relocated as demand requires.

It is a goal of certain embodiments of the inventive technology to provide a hydraulic energy converter that conserves energy resources in utilizing a renewable resource and in reducing the consumption of grid electricity (which, again, often is generated via combustion of a non-renewable, limited fossil fuel-coal).

It is a goal of certain embodiments of the inventive technology to provide a hydraulic energy converter that may be constructed, in large part, from readily available components, perhaps even formerly used components.

It is a goal of certain embodiments of the inventive technology to provide agriculture with a solution to the high electricity costs they face due to irrigation systems.

It is a goal of certain embodiments of the inventive technology to provide a wind energy converter that may be readily relocated as demand requires.

It is a goal of certain embodiments of the inventive technology to provide a wind energy converter that conserves energy resources in utilizing a renewable resource and in reducing the consumption of grid electricity (which, again, often is generated via combustion of a non-renewable, limited fossil fuel-coal).

It is a goal of certain embodiments of the inventive technology to provide a wind energy converter that may be constructed, in large part, from readily available components, perhaps even formerly used components.

Of course, other benefits and goals of the inventive technology are disclosed elsewhere in this application.

DETAILED DESCRIPTION OF THE INVENTION

Figure 1:
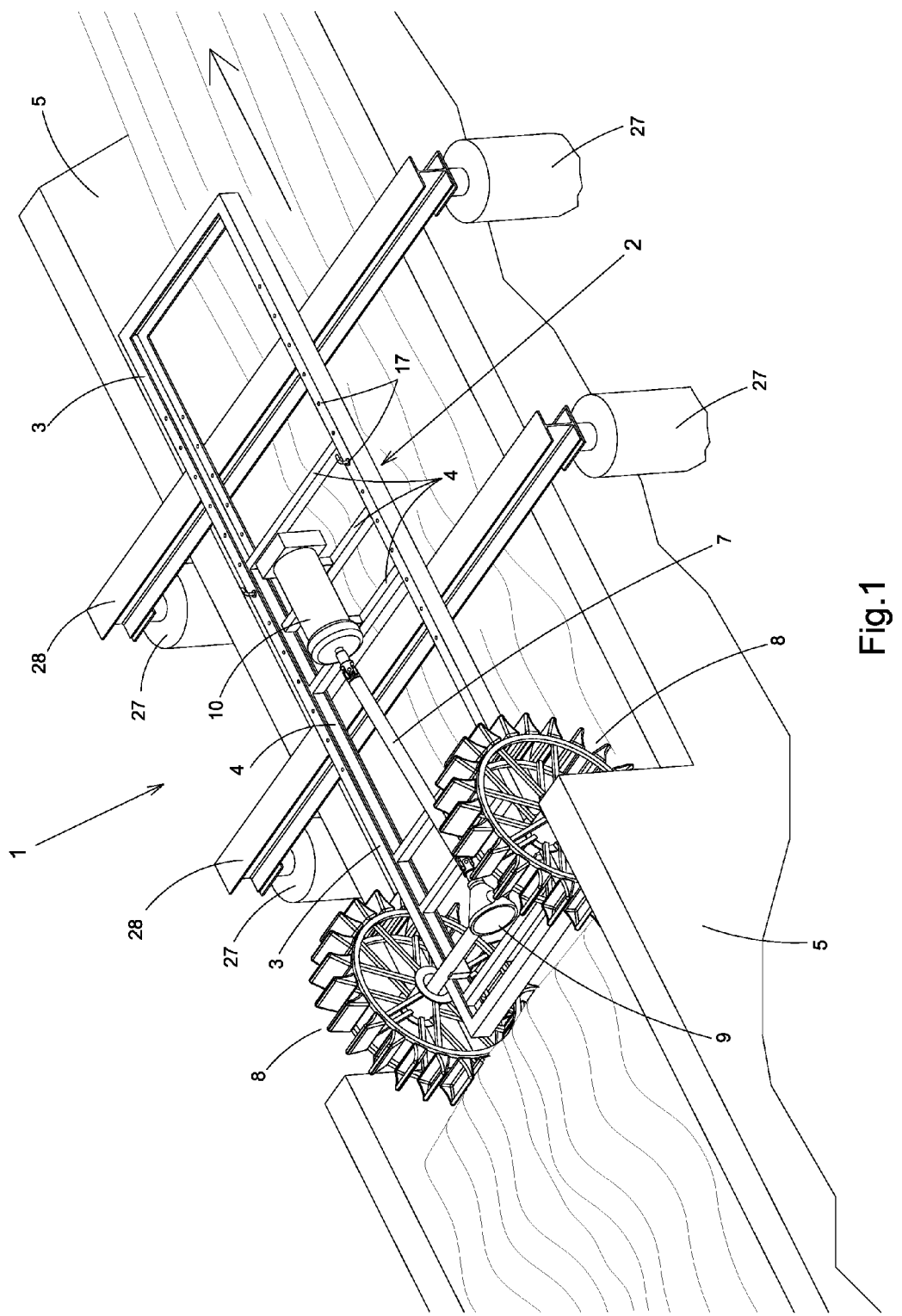
FIG. 1 shows a perspective view of an embodiment of the inventive hydraulic energy conveter in position over a canal.

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

At least one embodiment of the inventive technology may be described as a hydraulic energy converter 1 and may comprise: a frame assembly 2 comprising a first frame portion 3 and a second frame portion 4 that is positionally adjustable relative to the first frame portion 3, the first frame portion 3 affixable in stationary position relative to a water channel structure 5; an axle 6 supported by the second frame portion 4 (but still allowing rotation of the axle relative to the second frame portion); a driveshaft 7 established substantially orthogonally to the axle 6; waterwheels 8 connected with the axle 6 (often via bearings and/or bushings, as is well know); a gearbox 9 (e.g., a 90 degree gearbox) connecting the driveshaft 7 with the axle 6 (perhaps at 90 degrees) and established between the waterwheels 8; and at least one rotational energy converting device 10 connected with the driveshaft 7 and the second frame portion 4.

Another related hydraulic energy converter 1 may be described as comprising: an outer frame 11 that is affixable in stationary position relative to a water channel structure 5, the outer frame 11 defining a frame plane 12; an inner frame 13 established substantially within the outer frame 11 and substantially in the frame plane 12; an axle 6 supported by the inner frame 13; a driveshaft 7 established substantially orthogonally to the axle 6; waterwheels 8 connected with the axle 6; a gearbox 9 connecting the driveshaft 7 with the axle 6 and established between the waterwheels 8; and at least one rotational energy converting device 10 connected with the driveshaft 7 and the inner frame 13.

Another inventive hydraulic energy converter may be described as comprising: a frame assembly 2 having a first frame portion 3 that is affixable in stationary position relative to a water channel structure 5 and a second frame portion 4 positionally adjustable relative to the first frame portion 3; an axle 6 supported by the frame assembly 2; a driveshaft 7 established substantially orthogonally to the axle 6; waterwheels 8 connected with the axle 6; and a gearbox 9 connecting the driveshaft 7 with the axle 6 and established between the waterwheels 8; and at least one rotational energy converting device 10 connected with the driveshaft 7 and the frame assembly 2 (e.g., the second frame portion such as the inner frame). In these, and other embodiments, the at least one rotational energy converting device 10 is connected with the driveshaft 7 and the second frame portion 4 (e.g., the inner frame). The axle 6 also may be supported by the second frame portion 4.

Still another aspect of the inventive technology may be described as a hydraulic energy converter 1 that comprises: a frame assembly 2, at least a portion of which is affixable in stationary position relative to a water channel structure 5; an axle 6 supported by the frame assembly 2; a driveshaft 7 established substantially orthogonally to the axle 6; waterwheels 8 connected with the axle 6; a differential 12 (a closed differential 13, an open differential, or a limited slip differential, as but three examples) connecting the driveshaft 7 with the axle 6 and established between the waterwheels 8; and at least one rotational energy converting device 10 connected with the driveshaft 7 and the frame assembly (e.g., supported by an inner frame of the frame assembly). Limited slip and open differentials can accommodate, to different degrees, different rotational speeds of one wheel as compared with the other (e.g., as may be caused by debris slowing or even blocking one but not the other waterwheel).

One embodiment of the inventive technology may be described as a hydraulic energy converter 1 that comprises a frame assembly 2 affixable in stationary position relative to a water channel structure 5; an axle 6 supported by the frame assembly; a driveshaft 7 established substantially orthogonally to the axle; waterwheels 8 connected with the axle; a ninety degree gearbox 31 connecting the driveshaft with the axle and established between the waterwheels; and at least one rotational energy converting device 10 connected with the driveshaft and frame assembly. In this (and other embodiments), the frame assembly may (but need not necessarily) include a first frame portion 3 (e.g., an outer frame 11) and a second frame portion 4 (an inner frame 13) that is positionally adjustable relative to the first frame portion, where the first frame portion is affixable in stationary position relative to a water channel structure 5. Other details regarding the frame assembly in these particular embodiments(s) may be as described in remaining parts of the application. It is of note that the term frame assembly as used herein may be need not have more than one component parts or portions.

The term hydraulic energy converter 1 indicates a system that, during operation, is capable of converting hydraulic energy (which is found in any flowing, including falling, water) to a more desired form (electric power or compressed fluid, as but two of many examples). Affixable in stationary position relative to a water channel structure merely means that the referenced component can be affixed such that it is stationary relative to a water channel structure. Such does not require connection to the water channel structure, as indeed a preferred (but not required) method of affixing a frame portion such that it is in stationary position relative to a water channel structure is affixing such frame portion to concrete piers poured on either side of the water channel structure (see FIG. 1, e.g.).

Figure 2:
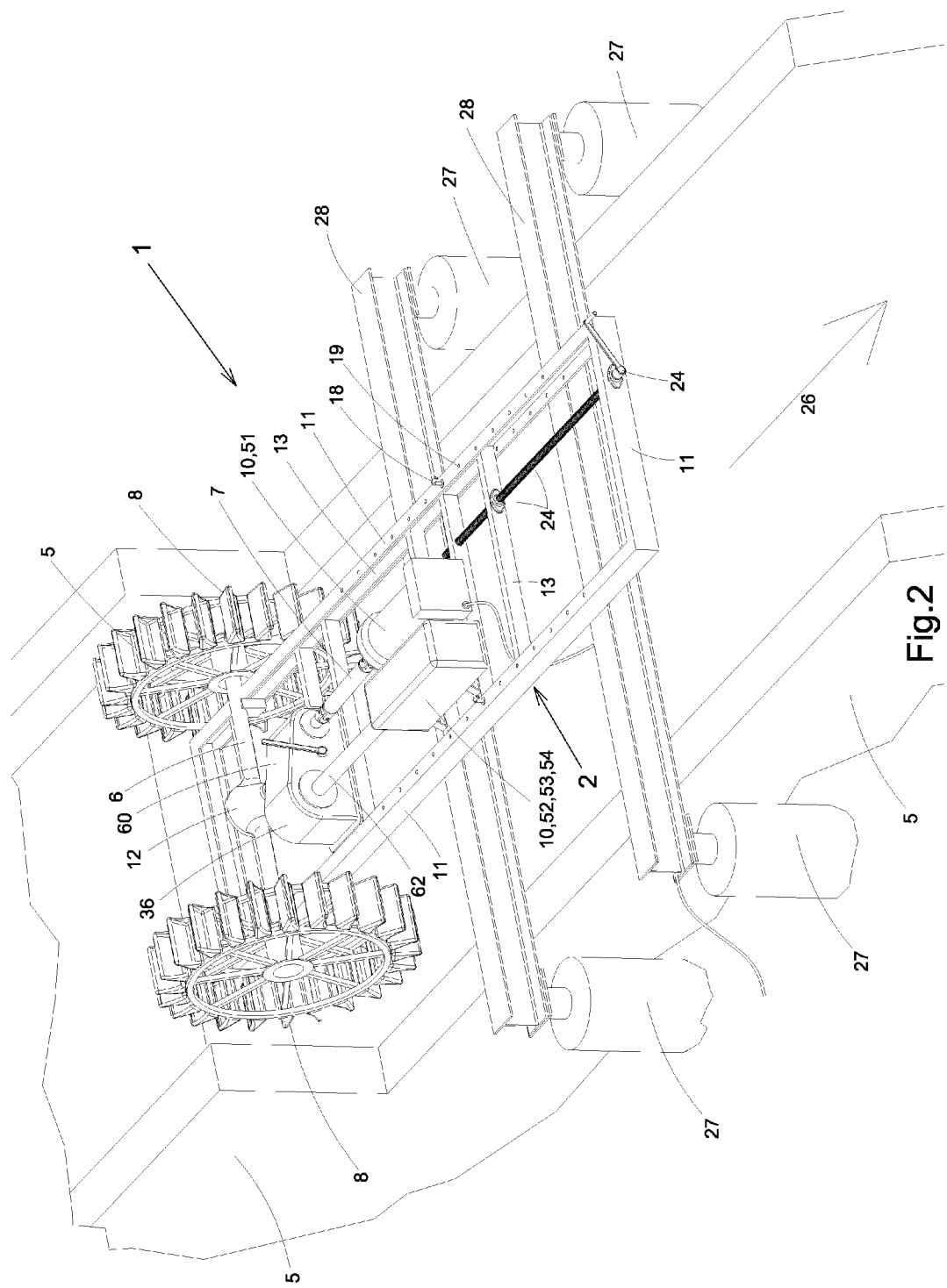
FIG. 2 shows a perspective view of an embodiment of the inventive hydraulic energy conveter in position over a canal (flowing water not shown for clarity reasons).
Figure 3:
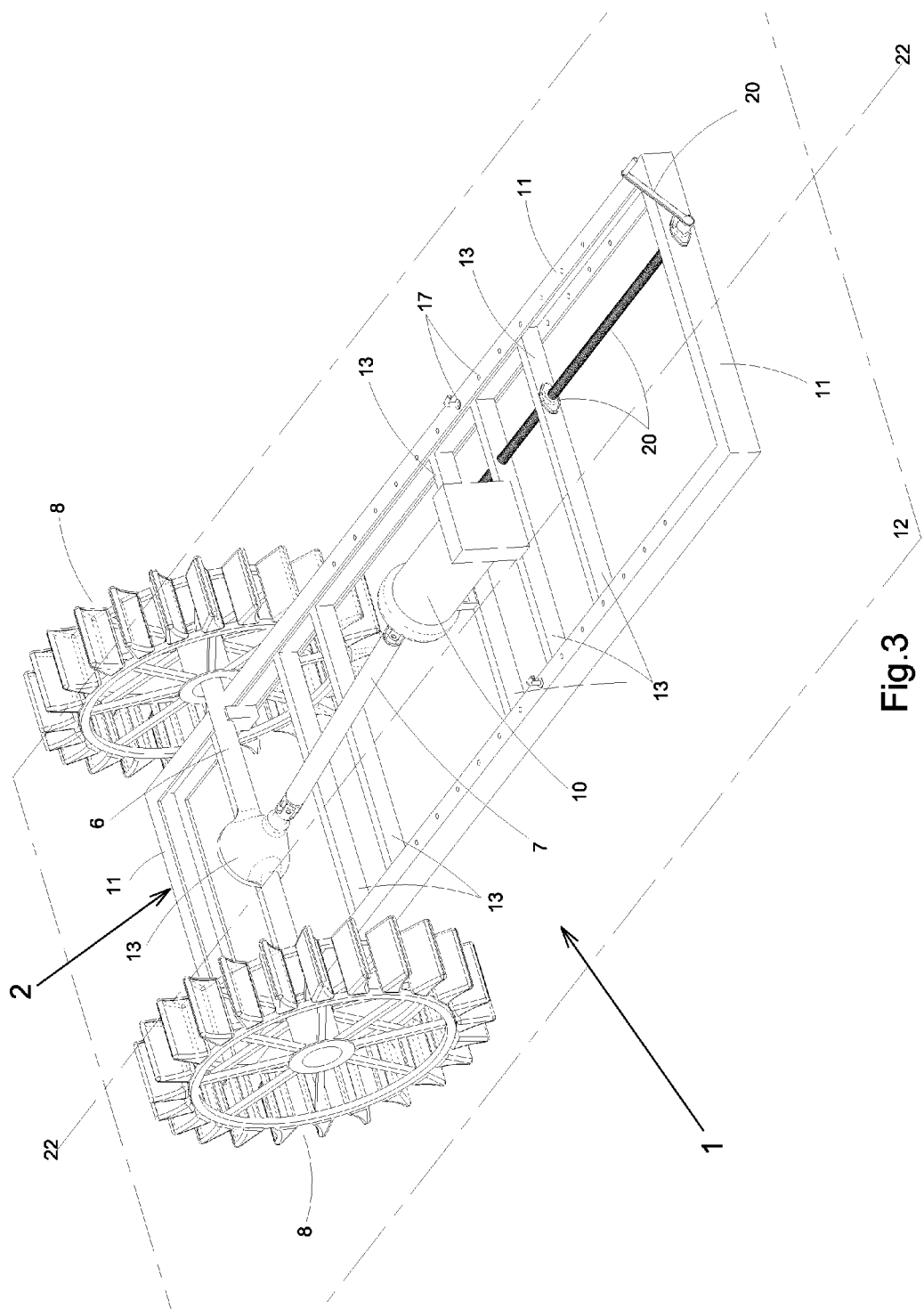
FIG. 3 shows a perspective view of an embodiment of the inventive hydraulic energy conveter.
Figure 4:
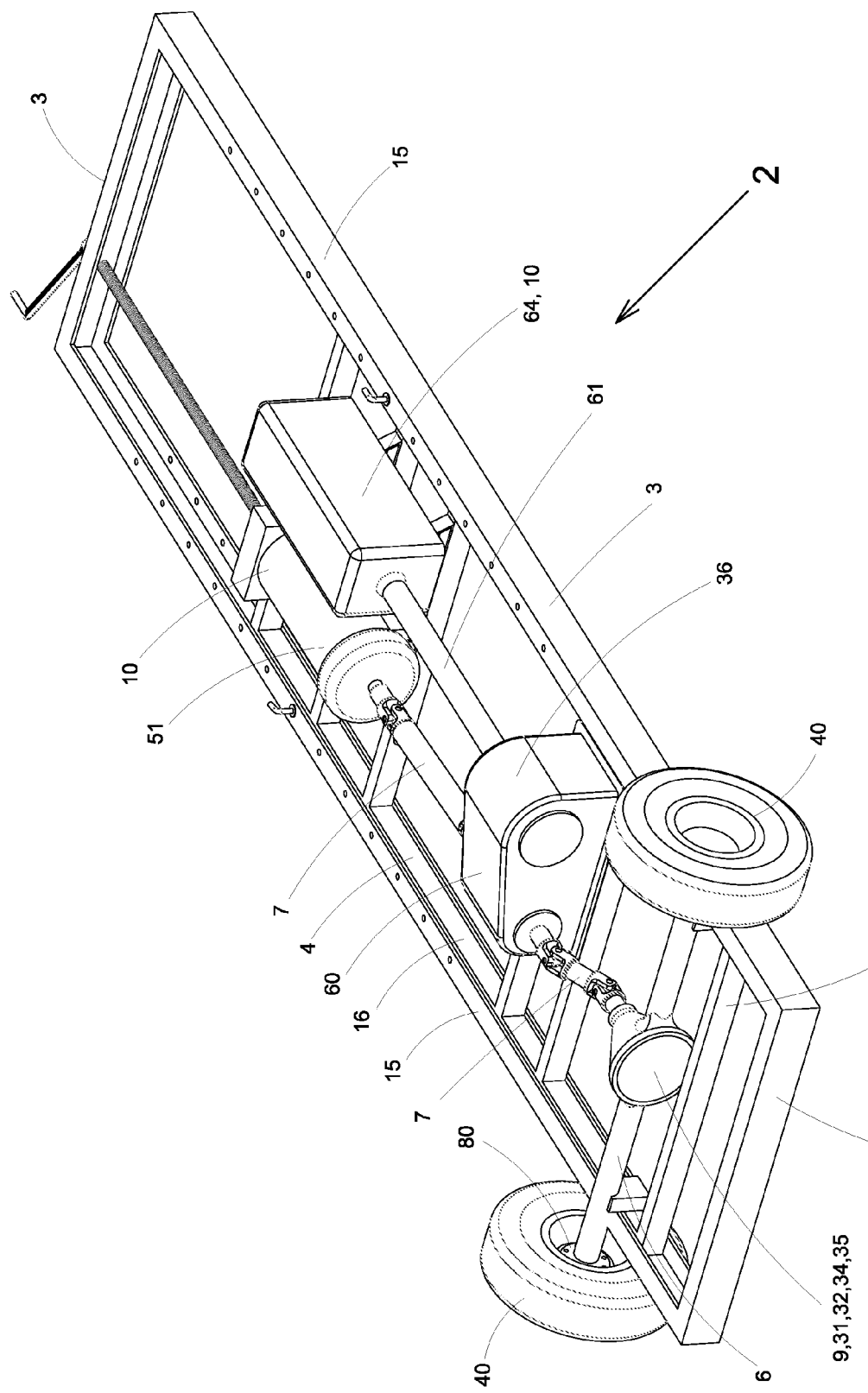
FIG. 4 shows a perspective view of an embodiment of the inventive hydraulic energy conveter or wind energy converter with waterwheels (or wind-driven rotors) removed and replaced with vehicle wheels for ready transport of the apparatus.
Figure 5:
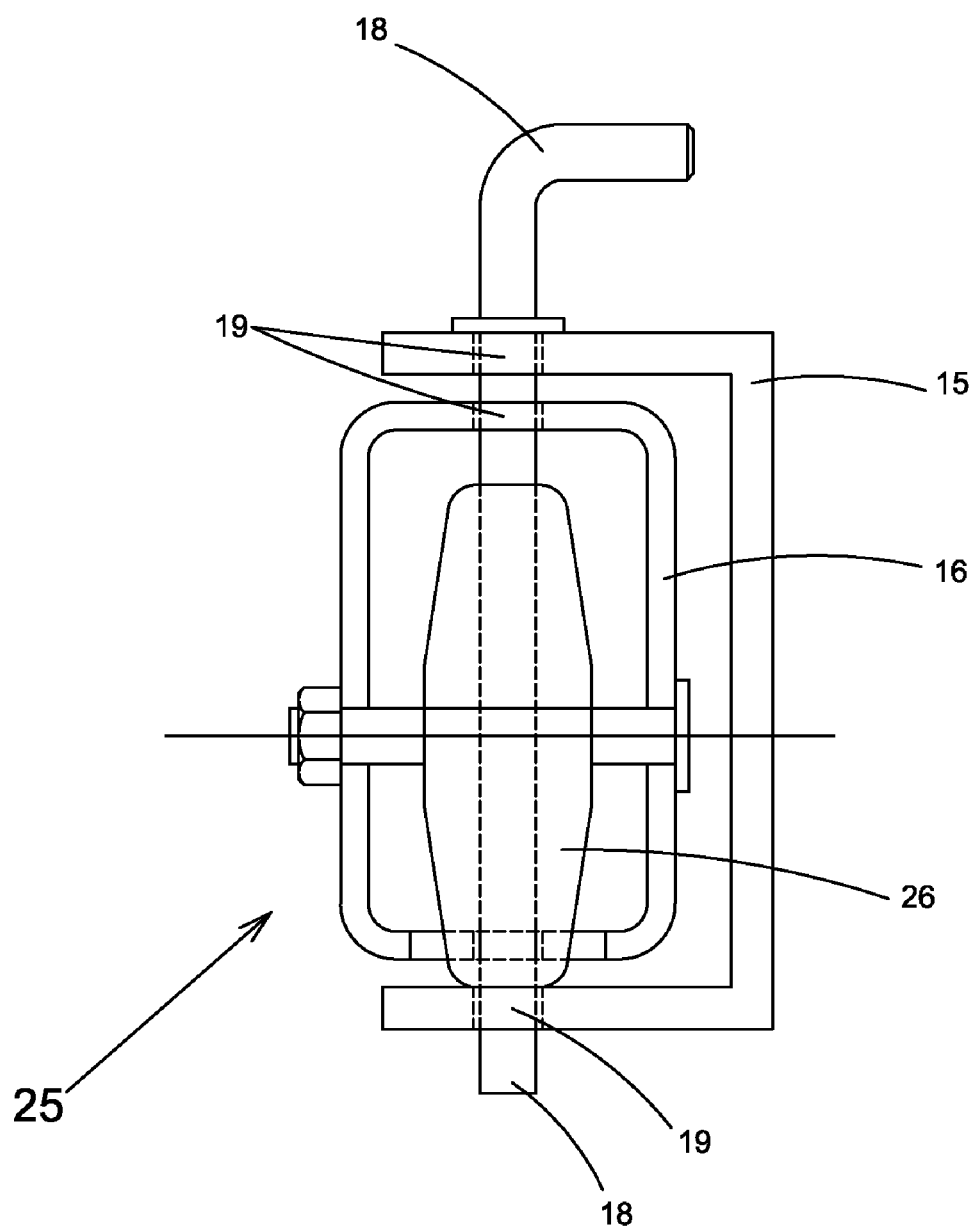
FIG. 5 shows a cross-section view of an embodiment of the frame assembly as may be found in an embodiment of the inventive hydraulic energy converter.

Water channel structures 5 include but are not limited to canals, drop structures, weirs, etc. Indeed, any structure through, above, via, or along which water flows, where such flow is sufficient to move a waterwheel 8, constitutes a water channel structure 5. Typically, water channel structures, like those found in agricultural settings, that the apparatus may be used on, are from 5 to 40 feet in width (but the inventive technology may still be used on channels having widths falling outside of this range). The most efficient and/or productive power generation may be seen when the waterwheels 8 are established at a drop (e.g., a small waterfall) of a drop structure (see, e.g., FIGS. 1 and 2). The term waterwheel 8 is a broad term, and includes any component that rotates when established (as intended or appropriately) in flowing water. It may include paddles or buckets around a circumference, and spokes that transfer force to a central component, such as a portion of an axle 6.

It is of note that where the axle 6 is supported the second frame portion 4 at a connection, such connection may still allow simple lifting of the axle 6 upwards from such frame portion 4; indeed, often such connections only prevent movement of the axle 6 along the longitudinal axis 22 of the second frame portion 4 (which, typically, is parallel with the flow direction). More generally, the term connect or connection(s) as used herein does not imply restriction of movement of one part or component relative to another in all dimensions, as two components are deemed connected even where relative motion in only a single dimension is prevented, or where rotation of one connected part relative to the other part is allowed. More particularly as relates to the axle 6, even where an open differential (as a type of gearbox 9) is used (such that the axle 6 is "split"), it is still the case that there is a single axle 6.

In certain of the various embodiments, the first frame portion 3 may be an outer frame 11 and the second frame portion 4 may be an inner frame 13 that is established substantially within the outer frame 11. Often, the second frame portion 4 (e.g., the inner frame 13) and the first frame portion 3 (e.g., the outer frame 11) may be established in substantially the same plane—frame plane 12 (e.g., which may, but need not necessarily, be a horizontal plane). Two frame portions are substantially in the same plane when all functional portions of the first frame portion 3 are vertically within no greater than one foot of functional portions of the second frame portion 4. It is of note that first frame portion 3 may include two first frame portion sides 15 relative to which sides 16 of the second frame portion 4 may slide or roll.

Preferably, there may be a position lock 17 usable to lock the second frame portion 4 (e.g., the inner frame 13) in a desired position relative to the first frame portion 3 (e.g., the outer frame 11). As but one example, the position lock 17 may be a pin 18 and holes 19 arrangement (e.g., where a series of holes 19 in each the first frame portion 3 and the second frame portion 4 may be aligned as desired to achieve the desired relative position, and a pin 18 (e.g., an elbow pin) may be placed through the two aligned holes). Adjustment of the second frame portion 4 (e.g., the inner frame 13) relative to the first frame portion 3 (e.g., the outer frame 11)—e.g., via movement of the second frame portion 4 along the longitudinal axis 22 defined by the first frame portion, perhaps by rolling or sliding (as but two examples)—may be accomplished via a position adjuster 20 to which the second frame portion 4 may be positionally responsive. Examples of the many different types of position adjusters 20 include a winch, whether electrically (or other) powered or manual, a pulley arrangement (whether with or without a winch), a threaded rod and crank arrangement 24, or a simple line (e.g., cable or rope) connection. Where gravity acts to "bias" the position of the second frame in a first direction relative to the second frame, a position adjuster that controls motion in only one direction (opposite the first direction) may be all that is needed; in other situations (where there is no biasing force), a bi-directional controller such as a threaded rod and crank system may be needed for full positional control. It is of note that position adjusters 20 are not an absolute necessity in some designs, as indeed position adjustment may be carried out without aid of a device such as a position adjuster (perhaps after unlocking the second frame portion 4 relative to the first frame portion 3 and then manually sliding the second frame portion relative to the first). What may facilitate positional adjustment of the second frame portion 4 (e.g., the inner frame 13) relative to the first frame portion 3 (e.g., the outer frame 11) is an adjustment facilitator 25. One type of adjustment facilitator involves four roller wheels 26 that allow the second frame portion 4 to roll relative to the first frame portion 3 (perhaps the first frame portion 3 is C or L shaped in cross-section and the rollers attached to the second frame portion 4 (e.g., the inner frame 13) rest on and roll on the lower part of such cross-section). One easily used roller-type adjustment facilitator that may function in such manner may include stub axles and hubs.

The water channel structure 5 may define a flow direction 26 (water flow direction) and the first frame portion 3 (e.g., the outer frame 11) may define a longitudinal axis 22 that, when the first frame portion 3 is established so that it is stationary relative to the water channel structure 5, is aligned with the flow direction 26. As mentioned, either the first frame portion 3 (which may be, e.g., the outer frame 11), or at least one portion of the frame assembly, may be stationary relative to the water channel structure 5. Typically, altering the water channel structure 5 in any manner (whether by drilling and bolting, or in other ways) is not permitted by regulation. As such, other non-invasive manners of establishing the frame portion so that it is stationary relative to the water channel structure 5 may be used. For example, concrete piers 27 may be poured (e.g., two on either side of the water channel structure, with one upstream of the other on each side), and support structures 28 may be established, each from one pier 27 to the corresponding pier 27 on the opposite side of the water channel structure 5. The frame assembly 2 (indeed, the entire hydraulic energy converter 1) may then be supported on this supplemental frame (perhaps via bolts, as but one example). Other manners of establishing a portion of the frame assembly 2 so that it is stationary relative to the water channel structure 5, in a manner that does not impermissibly alter the water channel structure 5 (e.g., by invasively breaching it), may involve, as but one example, clamping of a frame assembly 2 portion to opposite sides of the water channel structure. In such a case, the water wheels 8 may be inside the frame assembly 2. Where alteration of the water channel structure 8 is allowed (e.g., as may be the case where the owner of the land and the water canal are the same, and no regulations prohibit alteration), attaching the frame assembly portion to the concrete of the canal structure with expansion bolts, e.g., may be a feasible option. Such is another case where the water wheels 8 may be inside frame assembly 2. In any arrangement, it is of note that in a typical arrangement, the axle 6 will be perpendicular to the flow direction 26, and the drive shaft 7 will be parallel with the flow direction 26.

The waterwheels 8 may be disconnectable from the axle 6 and replaceable with vehicle wheels 40 for quick tow vehicle transport of remaining components of the hydraulic energy converter to a different location (perhaps for storage, perhaps to a different water channel or upstream or downstream on the same water channel). This feature may be achieved via use of a vehicle hub 80 (with hub flange) at either end of the axle, to which the waterwheel (or vehicle wheel) can be attached. A brake may be incorporated as part of the apparatus (whether as part of a disc, drum, or perhaps as acting on the axle at a different point, or perhaps acting on the driveshaft); a clutch may also be incorporated as part of the apparatus. The "waterwheel to vehicle wheel reconfiguration" feature adds a substantial benefit for certain users for whom re-location of a hydraulic energy converter is desired or advantageous. Of course, if flow through one drop structure stops, it may be desired to move to a different drop structure (presumably of a different canal). Further, local needs for power, e.g., may terminate, while others arise (perhaps the field currently being irrigated with a hydraulic energy converter run pump no longer needs water, while a distant field does); such would also motivate a relocation of the hydraulic energy converter that would be facilitated by quick tow vehicle transport.

The waterwheels 8 may established such that they are overshot, undershot, breastshot, or even backshot, but for reasons relative to simplicity of installation and efficiency, typical applications seem to be most amenable to an undershot design. Well known optimal waterwheel design criteria (e.g., use of a prime number of buckets 81 (or paddles or blades) on the waterwheel 8 might mitigate risk of resonance problems during operation) may be used. Further, a series of apparatus can be established successively on the same water course (perhaps each on one of a series of slides). A suitable type of bucket for use on the wheels may be a Tapco™ elevator bucket. For a given channel application, other design particulars (e.g., size) of the waterwheel may be determined according to known methods.

The gearbox (whether for the hydraulic or wind energy converter) may be a 90 degree gearbox 31, which includes, among other things, those differentials (whether locked, free (open), or slip) that redirect rotation in a 90 degree direction. In particular locked differential 32 systems, the differential may include a spool (which may replace spider and side gears). The gearbox may be a vehicle gearbox 34 (e.g., a vehicle differential 35), in certain embodiments (whether modified or not). The gearbox may be sealed, and permanently lubricated. Further, the gearbox may have a gear ratio that is selected for a particular channel application, as some applications (high vs. low water, pump vs. generator, etc.) may require or simply work better at a particular gear ratio (or within a certain gear ratio range). Instead, or additionally, there may be a transmission that enables selection of a desired gear ratio. The rotational energy converting devices 10 themselves may have an integral gearing system that provides a gearing. It may be that more than one of the rotational energy converting device(s) 10, a transmission, a differential, an inline gear box, and a transfer case 36, each allows selection of a particular gear (whether on the fly or only during purchase/installation). In such case, gear selections may need to be coordinated to provide the desired rotational speed to the rotational energy converting device 10. Of course, the gear ratio indicates the ratio of the gears, and the resulting ratio of the rpm's of the input to and output from the gearing apparatus (or vice versa). In certain embodiments, the desired gear ratio may be achieved via an inline gear box (whether a reducer or other), by a transmission, by simply replacing the differential with a differential having the desired gear ration, or in other manner. The optimal ratio may be, in some instances, selected via formula. It is of note that any transfer case 36 may be incorporated as part of the gearbox.

The term rotational energy converting device 10 refers to devices, such as electrical generators 51, compressors 52, water pumps 53, and hydraulic pump 54 (as but four of many examples) that convert rotational energy (e.g., of a rotating driveshaft) to a desired output (electricity or water under pressure, as but two examples). The rotational energy converting device(s) 10 may be an electric power generator 51, and/or a water pump 53, a hydraulic pump 54, or a compressor 52, as but a few examples. Even when there is not a localized need for electric power, the generator 51 may be run to power the grid, thereby either saving the owner grid based power costs, or perhaps even supplementing the owner's income with payback from the power company operating the grid (e.g., as in net metering).

In particular embodiments, there may be included a device—a converting device selector 60—that allows selection of one or more of the rotational energy converting devices 10 to render such device(s) online and operational during water flow operation of the hydraulic energy converter. Such apparatus involve well known sub-components, such as conventional electronics, servomotors, gears, movable shafts, a transfer case 36 (whether divorce mounted or married to a transmission), additional driveshafts 62, clutch(es), and/or converting devices. In one embodiment, which contemplates that a generator 51 will always be online, and that an additional converting device 64 may be added if desired (e.g., a compressor or water pump), a transfer case 36 may be used to apply rotational energy from the main driveshaft 7 (that powers the generator, for example) to a secondary driveshaft 62 (that powers the additional converting device). Such transfer case may or may not have two speeds. Typically, it (or perhaps a transmission or other geared device) would provide a neutral gear, allowing disengagement of rotational input to each of the converting devices, as desired.

Of course, any pumps that are run by the apparatus may be for a sprinkler irrigation system (e.g., a center pivot system, whether with or without corner attachment; a linear move system; a traveling big gun; or a side roll). Often, depending perhaps on the type used and whether it needs a drive in addition to water spray, a single inventive apparatus may be used to power both a generator that is used to power the movement drive (e.g., the wheels on a center pivot system), and, also, a water compressor for the spray.

One particular advantage of the inventive technology, as applied in a water channel structure 8, particularly on a farm, is that farm operators, while having abundant source of water (in the water channel, e.g.), have high electrical power costs to run what are often electrically powered center pivot irrigation systems (e.g., one rotation of a pivot system can cost $2,000.00 in electrical power). As such, use of a generator can help to allay the impact of such costs. Some farms are in consistently windy areas, such that a wind energy converter can help to ally such cost impact. Further, acknowledging a trend away from electrical powering of center pivot irrigation systems and towards water driven center pivot systems, one sees that the instant inventive technology is particularly suited for such a system. Whether by merely adding a water compressor 52 onto the secondary drive train (such that electrical power and/or compressed water may be generated), or by replacing the generator 51 with a water compressor 52, a compressed water driven center pivot (or other type of compressed water driven irrigation system) can be readily powered by certain embodiments of the inventive technology. Indeed, the electrical costs of conventional electrically powered irrigation systems may be avoided by driving a compressor whose output (compressed water or hydraulic fluid) drives an irrigation system. Of course, if a system is hydraulically driven (with compressed hydraulic fluid instead of compressed water), such system would also benefit from embodiments of the inventive technology.

As mentioned, the inventive technology is not limited only to the harnessing of power from flowing water. Indeed, certain embodiments of the inventive technology may involve the harnessing and conversion of windpower via a wind energy converter 101.

Particular embodiments of the inventive technology may be described as a wind energy converter 101 that comprises: an axle 102 having two ends 103, 104; two rotors 105 (anything that rotates upon being hit by wind), each of which is established at a different one of the two ends of the axle; a driveshaft 106 established substantially orthogonally to the axle; a ninety degree gearbox 107 connecting the driveshaft with the axle and established between the two rotors; an operational controller 108 established to control operation of the wind converter apparatus; at least one rotational energy converting device 110 connected with the driveshaft; and a frame 111 that supports the axle and the at least one rotational energy converting device.

As is well know, the operation controller may, inter alia, prevent operation during underspeed and overspeed conditions by providing cut-in and cut-out control. Other control (e.g., maximum efficiency for lower winds, and, for higher winds, regulating to limit power to a rated output above a rated speed or power, e.g.) may be provided by a controller operating according to any well know methods (via changing rotor blade angle, controlling generator (or other rotational energy converting device speed), or changing apparatus rotation (about a vertical axis), as but a few examples). Of course, the reason such control is needed when wind energy is harvested is the variability of wind speed. Speed of water in a channel or canal, on the other hand, is fairly constant and predictable, and thus the hydraulic energy converter does not require such operational control. It is of note that in certain designs the controller may comprise, at least in part, the gearbox, or other components. A controller may even be part of the rotors themselves (see FIG. 7).

The frame of a wind energy converter is whatever provides support to weight of the rotors, the axle, the gearbox, the driveshaft, the at least one rotational energy converting device, and, perhaps also, the speed controller. It may be one part; it may include several parts. It is also of note that the frame need not (but certainly may) offer the type of adjustment afforded by certain designs of the hydraulic energy converter (such adjustment capability as discussed above). As such, in certain designs, one portion of the frame may be movable relative to another portion (see FIG. 6). This may be the case, e.g., in those embodiments where the hydraulic energy converter may be converted to a wind energy converter. Such conversion (from a hydraulic to a wind energy converter) may be accomplished merely upon replacement of the waterwheels with rotors and, if desired, incorporation of the pivot componentry into the frame, and the speed controller into the apparatus (see additional explanation regarding the pivot componentry and the speed controller below). At times it may be desired that the apparatus, when used as a wind energy converter, be staged in a location that is different from the water conveyance channel structure above which it may be established during its use as a hydraulic energy converter. In such case, it may be necessary to first replace the waterwheels with vehicle wheels (which include tires) so that the apparatus may be moved to the site where it is to then, after replacement of the vehicle wheels (and other necessary alterations), operate as a wind energy converter.

The frame may include pivot componentry 112 that is established to allow the axle to pivot about a vertical axis (e.g., as defined by the pivot componentry). In one embodiment, the pivot componentry may comprise a vertical post 113 (and associated components such as bearings and a flange(s)) or a turntable (as but two manners in which pivoting motion may be achieved). The pivot componentry, which may be well known in the art, in allowing the rotors to rotate about a common vertical axis, may allow the rotors to achieve a proper orientation relative to the wind (e.g., facing into or orthogonal to the wind, depending on the type rotor). This may be the case even where only partial rotation is allowed. In this regard, it is of note that at times it might not be desired that the rotors be entirely free spinning about a vertical axis, as such might effect an uncontrolled operation and result in entanglement of any cords, hoses or cables coming out of the rotational energy converting devices (e.g., power cables coming out of the generator). A pivot position lock 114 may be incorporated into the design in order to allow a selection of the orientation of the apparatus rotors relative to north, south, east and west. In such manner, an operator can accommodate a changing wind direction and re-orient the rotors so that they are properly positioned relative to the anticipated or prevailing wind direction 125. Examples of pivot locks include pin and hole and pin and slot systems. A certain degree of "play" (e.g., 15 degrees on either side of a prevailing wind direction) might be desirable (see FIG. 7); such play can be accomplished via a pin and slot system. In order to prevent "slamming" (abrupt stoppage of rotation) of the apparatus portion that rotates when the wind changes drastically and the resultant rotation of the rotors quickly stops (e.g., as provided when the pin hits the end of the slot at 15 degrees on either side of the central position), cushioning and/or biasing components may be incorporated into the pivot componentry.

Figure 6:
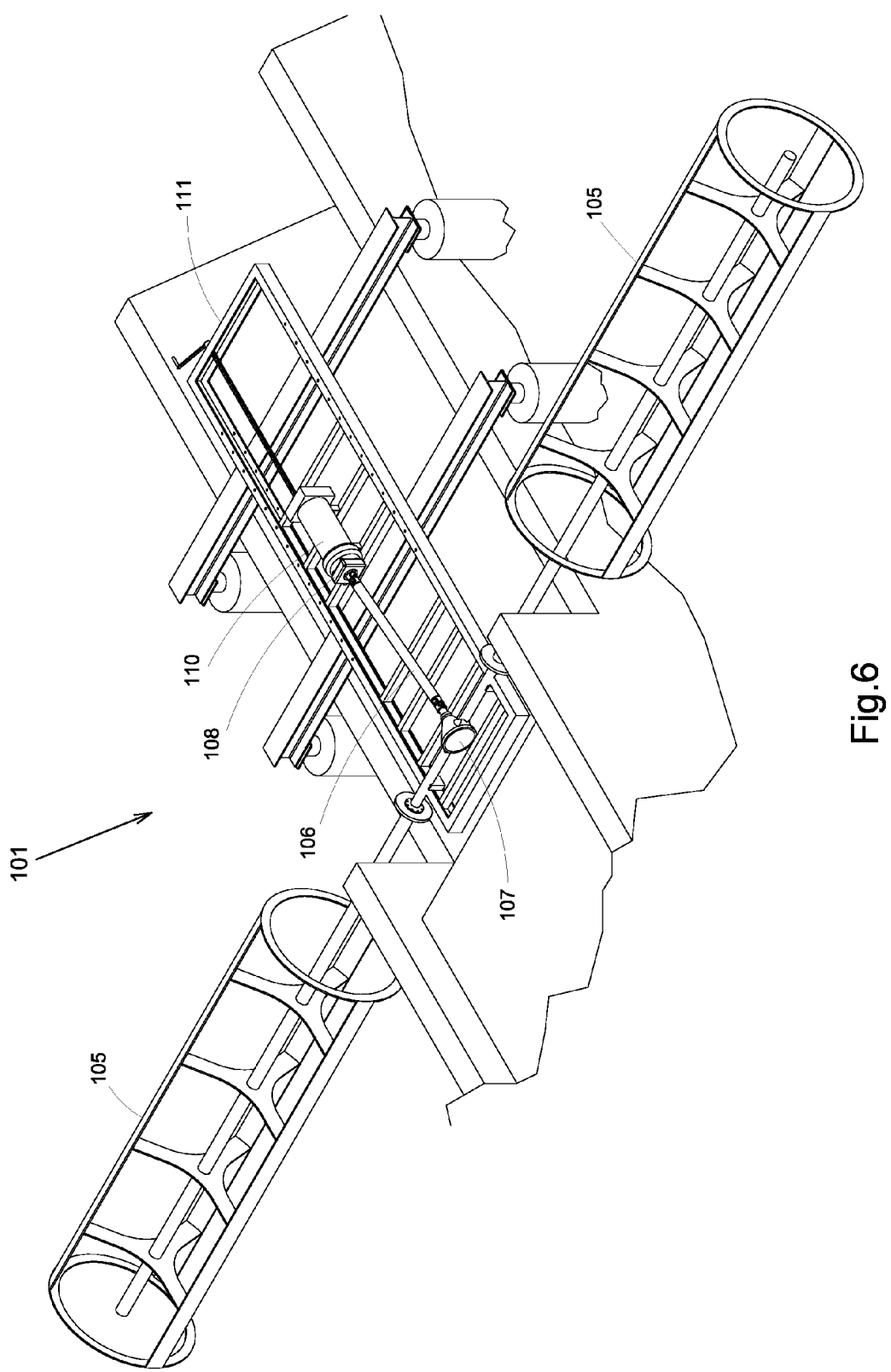
FIG. 6 shows a perspective view of an embodiment of the inventive wind energy conveter in position over a canal.
Figure 7:
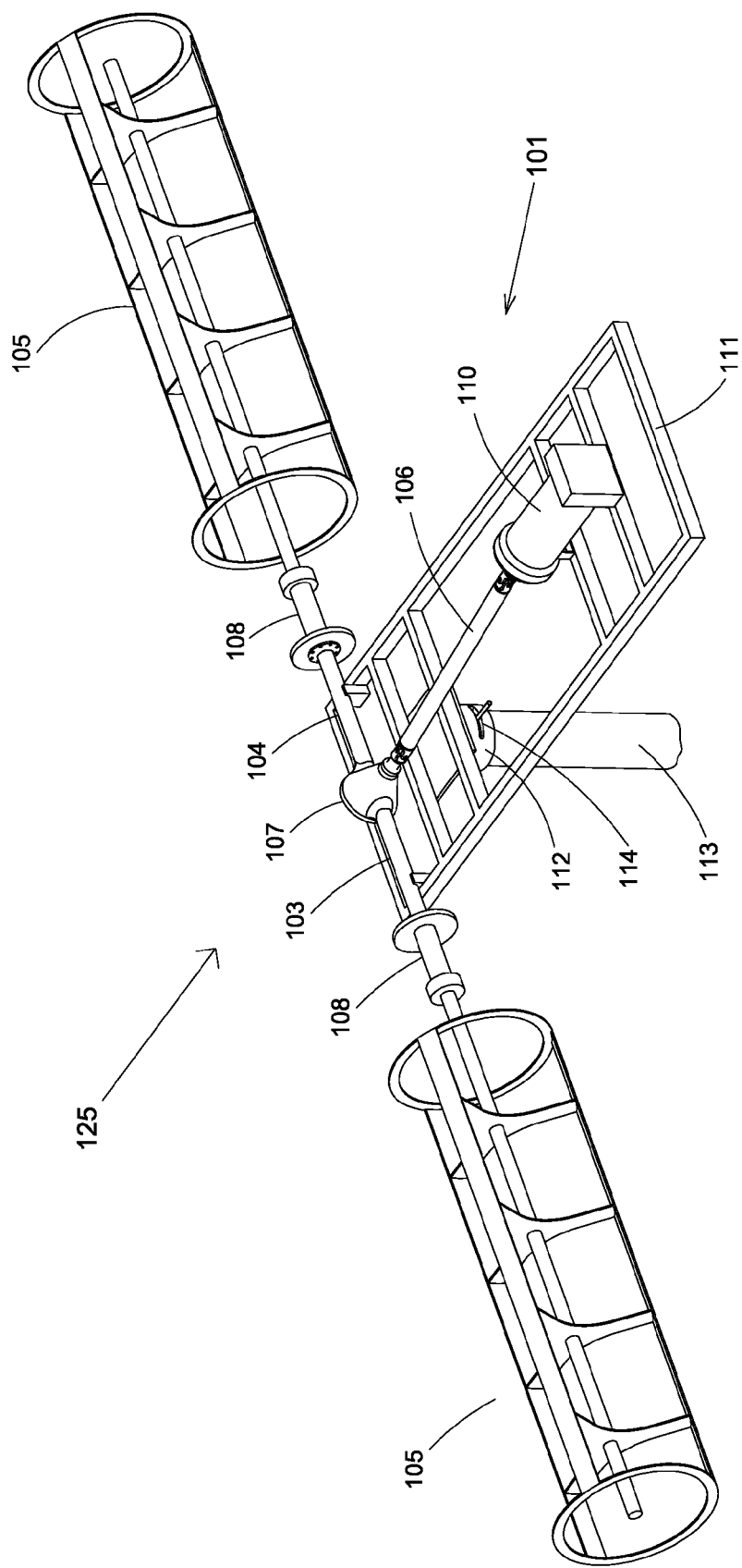
FIG. 7 shows a perspective view of an embodiment of the inventive wind energy conveter.

Rotors may be horizontal axis rotors (i.e., that rotate about a horizontal axis) or, perhaps less preferably, vertical axis rotors. Horizontal axis rotors may include airfoils that are substantially horizontal in orientation (e.g., see Windspire™ rotors, oriented such that their long axis is horizontal, as shown in FIGS. 6 and 7), or more conventional airfoils that radiate outwardly (in a vertical plane) from a respective axle end. These are but two examples of horizontal axis rotors that may be used.

Rotors may be disconnectable from the axle and replaceable with vehicle tires for quick tow vehicle transport of remaining components of the wind energy converter. As with the water power harnessing apparatus, it may be necessary to detach the frame from whatever it is attached to (e.g., concrete piers, a vertical post) and/or other components first, before the apparatus can be driven offsite. When the wind energy converter apparatus is situated above a water conveyance structure (perhaps it was initially used to convert hydraulic energy), all that may be necessary to convert the apparatus such that it can be used for hydraulic energy conversion is replacement of the waterwheels with wind driven rotors, and perhaps incorporation of pivot componentry and an operation controller. This and other quick conversion affordabilities of the apparatus provides the significant and important benefit of ready deployment of the apparatus as energy resources and demands change.

Specifics for the gearbox, the rotational energy converting devices, and certain other aspects of the apparatus, may be as discussed above relative to the hydraulic energy converter. Advantages described above relative to the hydraulic energy converter may also apply to the wind energy converter.

As can be easily understood from the foregoing, the basic concepts of the present invention may be embodied in a variety of ways. It involves both energy conversion techniques as well as devices to accomplish the appropriate energy conversion. In this application, the energy conversion techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "converter" should be understood to encompass disclosure of the act of "converting"—whether explicitly discussed or not— and, conversely, were there effectively disclosure of the act of "converting", such a disclosure should be understood to encompass disclosure of a "converter" and even a "means for converting" Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the converter devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. It is also of note that to the claims presented herein should be added the following: A system substantially as herein described with reference to any one or more of the Figures and Description.

What is claimed is:

1. A hydraulic energy converter, comprising:
    a frame assembly comprising a first frame portion and a second frame portion that is positionally adjustable relative to said first frame portion, said first frame portion affixable in stationary position relative to a water channel structure;
    an axle supported by said second frame portion;
    a driveshaft established substantially orthogonally to said axle;
    waterwheels connected with said axle;
    a ninety degree gearbox connecting said driveshaft with said axle and established between said waterwheels; and
    at least one rotational energy converting device connected with said driveshaft and said second frame portion.

2. A hydraulic energy converter as described in claim 1 wherein said first frame portion comprises an outer frame and said second frame portion comprises an inner frame that is established substantially within said outer frame.

3. A hydraulic energy converter as described in claim 2 wherein said inner frame and said outer frame are established in substantially the same plane.

4. A hydraulic energy converter as described in claim 1 further comprising a position lock usable to lock said second frame portion in a desired position relative to said first frame portion.

5. A hydraulic energy converter as described in claim 4 wherein said position lock comprises a pin and holes arrangement.

6. A hydraulic energy converter as described in claim 1 further comprising a position adjuster to which said second frame portion is positionally responsive.

7. A hydraulic energy converter as described in claim 6 wherein said position adjuster comprises an adjuster selected from the group consisting of: winch, pulley arrangement, and line connection.

8. A hydraulic energy converter as described in claim 1 further comprising an adjustment facilitator that facilitates positional adjustment of said second frame portion relative to said first frame portion.

9. A hydraulic energy converter as described in claim 8 wherein said adjustment facilitator comprises at least four roller wheels.

10. A hydraulic energy converter as described in claim 9 wherein said adjustment facilitator further comprises stub axles and hubs.

11. A hydraulic energy converter as described in claim 1 wherein said water channel structure defines a flow direction and wherein said first frame portion defines a longitudinal axis that, when said first frame portion is established so that it is stationary relative to said water channel structure, is aligned with said flow direction.

12. A hydraulic energy converter as described in claim 1 wherein said waterwheels are disconnectable from said axle and replaceable with vehicle tires for quick tow vehicle transport of remaining components of said hydraulic energy converter.

13. A hydraulic energy converter as described in claim 1 wherein said ninety degree gearbox comprises a locked differential.

14. A hydraulic energy converter as described in claim 13 wherein said locked differential comprises a spool.

15. A hydraulic energy converter as described in claim 1 wherein said ninety degree gearbox has a gear ratio that is selected for a particular channel application.

16. A hydraulic energy converter as described in claim 1 wherein said at least one rotational energy converting device comprises an electric power generator.

17. A hydraulic energy converter as described in claim 1 wherein said at least one rotational energy converting device comprises a converting device selected from the group consisting of: water pump, hydraulic pump, and compressor.

18. A hydraulic energy converter as described in claim 1 further comprising a converting device selector usable to select one or more of said at least one rotational energy converting devices and render said one or more of said at least one rotational energy converting devices online and operational during water flow operation of said hydraulic energy converter.

* * * * *